US011522939B2

United States Patent
Nadeau et al.

(10) Patent No.: US 11,522,939 B2
(45) Date of Patent: Dec. 6, 2022

(54) OVER-THE-TOP MEDIA SERVICE TESTING AND QOE ISSUES ISOLATION

(71) Applicant: EXFO Inc., Québec (CA)

(72) Inventors: Sylvain Nadeau, Vaudreuil-Dorion (CA); Kevin Corre, Cesson-Sevigne (FR)

(73) Assignee: EXFO Inc., Québec (CA)

( * ) Notice: Subject to any disclaimer, the term of this patent is extended or adjusted under 35 U.S.C. 154(b) by 0 days.

(21) Appl. No.: 17/351,368

(22) Filed: Jun. 18, 2021

(65) Prior Publication Data

US 2021/0400104 A1 Dec. 23, 2021

Related U.S. Application Data

(60) Provisional application No. 63/112,714, filed on Nov. 12, 2020, provisional application No. 63/041,134, filed on Jun. 19, 2020.

(51) Int. Cl.
*H04L 65/80* (2022.01)
*H04L 67/02* (2022.01)
*H04L 65/61* (2022.01)

(52) U.S. Cl.
CPC .............. *H04L 65/80* (2013.01); *H04L 65/61* (2022.05); *H04L 67/02* (2013.01)

(58) Field of Classification Search
None
See application file for complete search history.

(56) References Cited

U.S. PATENT DOCUMENTS 7,633,942 B2   12/2009   Bearden et al.
7,936,916 B2   5/2011    Zhang et al.
(Continued)

FOREIGN PATENT DOCUMENTS

| CN | 109618565 A | * | 4/2019 | ......... H04L 41/5067 |
| EP | 2 530 870 A1 | | 5/2012 | |
| WO | WO-2020197466 A1 | * | 10/2020 | ........ H04W 56/0045 |

OTHER PUBLICATIONS

"Parametric bitstream-based quality assessment of progressive download and adaptive audiovisual streaming services over reliable transport", Oct. 2017, Telecommunication Standardization Sector of ITU, p. 1203, pp. 1-22 (Year: 2017).*

(Continued)

*Primary Examiner* — Jonathan A Bui (74) *Attorney, Agent, or Firm* — Clements Bernard Baratta; Lawrence A. Baratta, Jr.

(57) ABSTRACT

A method for Over-The-Top (OTT) media service monitoring and testing including deploying multiple test agents throughout the network and orchestrating them together to create a single OTT media service delivery path with coherent measurement points. The method includes selecting and configuring all test agents forming an OTT media service delivery path in a network, wherein the test agents are deployed on devices in the network with pairs of agents in a client-server relationship; for each selected test agent, simulating a Hyper Text Transport Protocol (HTTP) Adaptive Streaming (HAS) media playback using a pair test agent as a HAS server; for each selected test agent, monitoring the HAS media playback via a Quality of Experience (QoE) model to collect metrics, influence factors, and QoE scores; and reporting collected metrics, influence factors and QoE scores, wherein the QoE scores are compared to isolate any performance degradation.

19 Claims, 6 Drawing Sheets

(56) References Cited

U.S. PATENT DOCUMENTS

| | | | |
|---|---|---|---|
| 8,031,623 | B2 | 10/2011 | Beeson et al. |
| 8,775,343 | B2 | 7/2014 | Osin et al. |
| 8,811,167 | B2 | 8/2014 | Khilnani et al. |
| 8,813,144 | B2 | 8/2014 | Davis et al. |
| 8,897,144 | B2 | 11/2014 | Hui et al. |
| 9,397,947 | B2 | 7/2016 | Dunne et al. |
| 9,621,618 | B2 | 4/2017 | Cossa |
| 9,924,386 | B2 | 3/2018 | Jain et al. |
| 10,230,600 | B2 | 3/2019 | Bhasin et al. |
| 10,310,928 | B1 | 6/2019 | Hegar et al. |
| 10,326,848 | B2 | 6/2019 | Nath et al. |
| 10,390,069 | B2 | 8/2019 | Marchand et al. |
| 10,397,079 | B2 | 8/2019 | Barrett et al. |
| 10,439,902 | B2 | 10/2019 | Park et al. |
| 10,454,803 | B2 | 10/2019 | Gal et al. |
| 2016/0037176 | A1 | 2/2016 | Chari |
| 2016/0164761 | A1* | 6/2016 | Sathyanarayana ............ H04L 65/4084 709/219 |
| 2018/0206136 | A1 | 7/2018 | Chow et al. |
| 2019/0158564 | A1* | 5/2019 | Wang ................. H04L 41/5067 |
| 2019/0319868 | A1 | 10/2019 | Svennebring et al. |
| 2020/0059428 | A1 | 2/2020 | Nadeau |
| 2020/0084293 | A1* | 3/2020 | Chatterjee ............ H04L 41/069 |
| 2021/0176530 | A1* | 6/2021 | Lobanov .......... H04N 21/44222 |

OTHER PUBLICATIONS

Bouten et al., "QoE-Driven In-Network Optimization for Adaptive Video Streaming Based on Packet Sampling Measurements," ResearchGate, Feb. 10, 2015, pp. 1-20.

Petrangeli et al., "A Multi-Agent Q-Learning-based Framework for Achieving Fairness in HTTP Adaptive Streaming," ResearchGate, Conference Paper, May 2014, pp. 1-10.

Yu et al., "QoE-driven Dynamic Adaptive Video Streaming Strategy with Future Information," IEEE, pp. 1-12.

Barman et al., "QoE Modeling for HTTP Adaptive Video Streaming-A Survey and Open Challenges," IEEE Access, vol. 7, 2019, pp. 30831-30859.

Khan et al., "Content-Based Video Quality Prediction for MPEG4 Video Streaming over Wireless Networks," ResearchGate, Journal of Multimedia, vol. 4, No. 4, Aug. 2009, pp. 1-13.

Minovski et al., "Analysis and Estimation of Video QoE in Wireless Cellular Networks using Machine Learning," ResearchGate, IEEE, 2019, pp. 1-7.

Aug. 24, 2021, European Search Report for European Patent Application No. EP 21 18 0384.

* cited by examiner

OVER-THE-TOP MEDIA SERVICE TESTING AND QOE ISSUES ISOLATION

CROSS-REFERENCE TO RELATED APPLICATIONS

This disclosure claims priority to U.S. Provisional Patent Application No. 63/041,134, filed Jun. 19, 2020, and U.S. Provisional Patent Application No. 63/112,714, filed Nov. 12, 2020, the contents of both are incorporated by reference in their entirety.

TECHNICAL FIELD

The invention relates to Over-The-Top media service monitoring and testing and more precisely to the measurement and issue isolation related to network Quality of Experience (QoE) for the delivery of HTTP Adaptive Streaming services.

BACKGROUND

Over-The-Top (OTT) content includes audio, video, and other media content delivered over the Internet, without the involvement of a multiple-system operator (MSO) in the control or distribution of the content. The complete service is accessible through an internet connection, either locally or through a mobile network. The OTT services are typically monetized via paid subscriptions or free to consumers, generating revenue through advertisement or in-app purchases. The content can include audio streaming (internet radio and podcasts), video streaming (also called television content), instant messaging services or chats, and voice calling (usually called Voice over IP (VoIP). Consumers can access OTT content through Internet-connected devices such as mobile devices (phones), smart TVs, set-top boxes, gaming consoles, tablets, and desktop and laptop computers.

HTTP Adaptive Streaming (HAS) is a class of client-server protocols built on top of the Hyper Text Transport Protocol (HTTP). These protocols are used by OTT providers to deliver audio, video, or audio-video content divided into small media chunks or segments. In addition to these media segments, HAS servers also expose a manifest file which contains Uniform Resource Locators (URLs) for all the segments of a particular media content. During an HAS session, the HAS client will request segments in advance of their current playtime filling up their media buffer up to a given duration. If the network is not fast enough for the selected media, the client buffer may empty resulting in a stalling event, a media freeze, detrimental to the user QoE.

To avoid stalling events, HAS manifests may contain URLs for multiple quality encoding of the same media source. For an HAS client, it is thus possible to dynamically change the media quality by requesting a particular media segment. The HAS protocols allows for client-side controlled quality adaptation depending on the perceived quality of the network by the client.

These video quality adaptations are based on heuristic algorithms which are not necessarily optimal and are likely non-standardized. They use the perceived state of the network from their own point of view. When attempting to generally assess the network performance at multiple points in a network, the independent adaptation of the video streaming quality renders comparison difficult and can lower precision of the eventual assessment.

There are several existing solutions to perform OTT video testing and there are many methods to determine the QoE of HAS applications. For example, Barman et al. present 26 models to predict the subjective quality (e.g., Mean Opinion Score or MOS) for HAS applications in their 2019 IEEE Access paper entitled "QoE Modeling for HTTP Adaptive Video Streaming—A Survey and Open Challenges".

Several HAS technologies are used by video servers and players to deliver the best QoE as possible for each user. Some implementations include: Dynamic Adaptive Streaming over HTTP (DASH), Adobe HTTP Dynamic Streaming (HDS), Apple HTTP Live Streaming (HLS) and Microsoft Smooth Streaming.

The main drawback with existing solutions is that they do not offer the capacity of measuring reliably intermediate points throughout the media service delivery path to identify and isolate QoE issues (caching and transport problems, OTT provider server congestion, etc.).

Thus, there is a need for a method to reliably assess the contribution of the network to the HAS QoE at different points in the network.

SUMMARY

To properly troubleshoot media service issues, a segmented monitoring strategy provides the ability to assess the QoE at diverse locations within a network to locate bottlenecks, isolate caching and transport issues, and to identify OTT provider server congestion. A real-time OTT service monitoring with multi-point, orchestrated monitoring (many locations looking at the same content) is therefore provided. It is particularly useful for video content delivery.

A solution to the drawback of existing solutions is to deploy multiple test agents throughout the network and orchestrate them together to create a single delivery path with coherent measurement points. In one embodiment, this delivery path is a video streaming delivery path.

The main steps of the method for identifying and isolating network performance issues throughout an Over-The-Top (OTT) media service delivery path include: selecting and configuring all test agents forming an OTT media service delivery path in a network, wherein the test agents are deployed on devices in the network with pairs of agents in a client-server relationship; for each selected test agent, simulating a Hyper Text Transport Protocol (HTTP) Adaptive Streaming (HAS) media playback using a pair test agent as a HAS server; for each selected test agent, monitoring the HAS media playback via a Quality of Experience (QoE) model to collect metrics, influence factors, and QoE scores; and reporting collected metrics, influence factors and QoE scores, wherein the QoE scores are compared to isolate any performance degradation.

In one embodiment, an OTT media service is a video streaming service wherein the content resource is a video resource and the content segments are video segments.

In this specification, the term "Hypertext Transfer Protocol (HTTP)" or "HTTP" should be read broadly to include any subsequent revisions and extensions to the protocol such as HTTP/2 or HTTP/3.

BRIEF DESCRIPTION OF THE DRAWINGS

Having thus generally described the nature of the invention, reference will now be made to the accompanying drawings, showing by way of illustration example embodiments thereof and in which:

FIG. 4 illustrates the communication exchanges between the orchestrator and one worker and includes FIG. 4A for the orchestrator perspective and FIG. 4B for the worker perspective.

DETAILED DESCRIPTION

A major aspect of the current invention is that it deploys multiple test agents throughout the network and orchestrates them together to create a single media service delivery path with coherent measurement points.

To form a single media service delivery path, the test agents recursively act both as HAS clients and HAS servers. Considering a set of agents numbered from agent_0 to agent_X, they form a single delivery path if for each agent, agent_N acts as client and request media segments to agent_N−1 acting as server. On the path, agent_X only acts as HAS client while agent_0 request to the source HAS media server used for the test, e.g. an HAS OTT streaming service server.

As a HAS client, the main function of the test agent is to download the media segments from an HAS server according to the particular HAS protocol, i.e. DASH, HLS or any other HAS protocol, and monitor the buffer levels and stalling events while simulating the media playback.

Also, the test agent collects metrics during the test which are then used as input of a QoE estimation module. The QoE module maps these input metrics to a QoE score. To properly assess the QoE during the test, the HAS client functionalities related to QoE must be in adequation with the selected QoE module. For instance, if the QoE module only reacts to stall events and does not consider quality switch, then the HAS client must not do quality switches during the test.

As a HAS server, the main function of the test agent is to relay the media content to the next test agent in the chain when receiving request.

Figure 1:
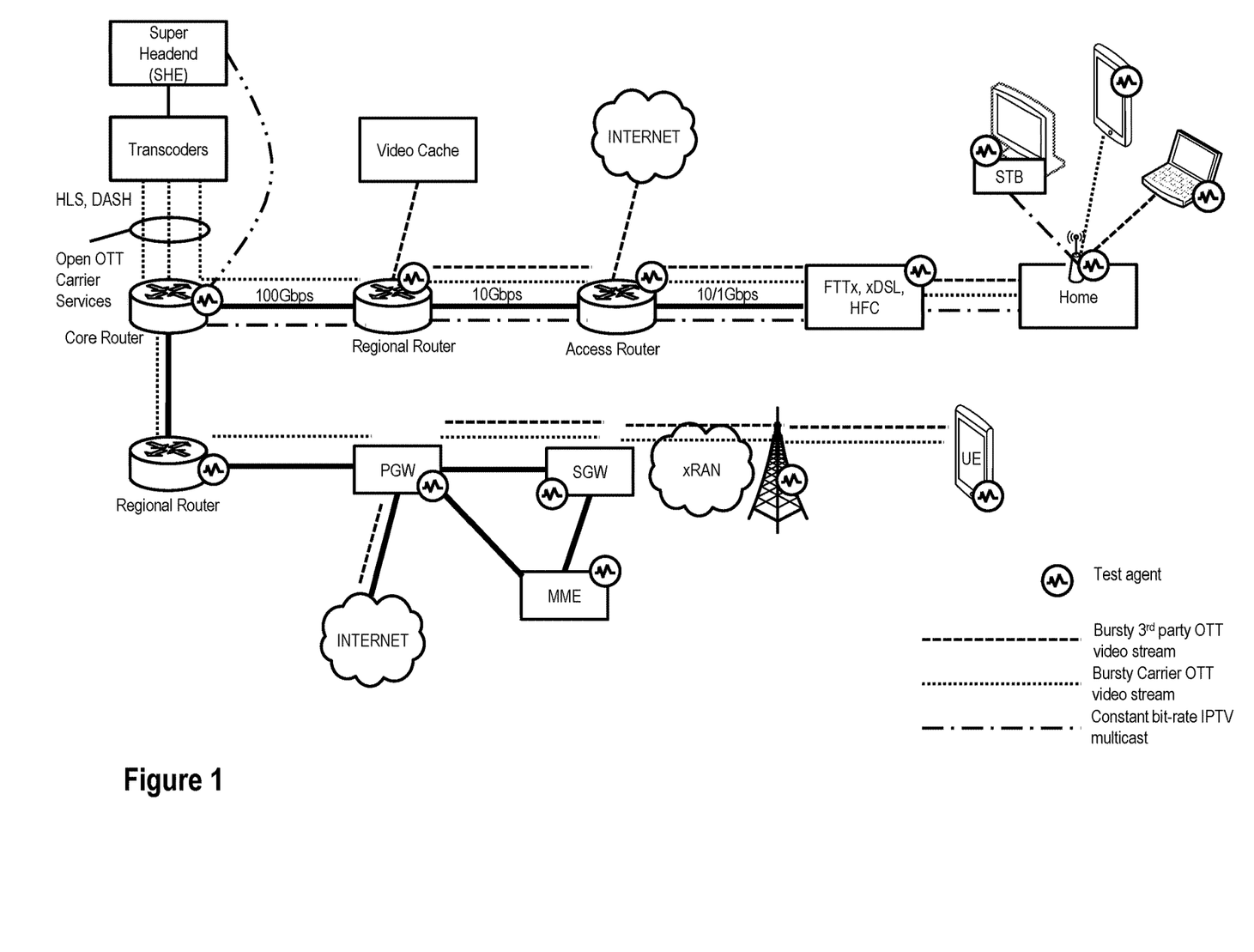
FIG. 1 illustrates different approaches for video stream delivery.

FIG. 1 illustrates different approaches for video stream delivery (IP Multicast, Carrier OTT, 3rd party OTT). This invention targets any OTT media content delivery, including video streaming delivery. Example video streaming delivery can be carried out by video streaming applications such as Video-On-Demand (YouTube, Netflix, Amazon Video, Hulu, etc.) and Live streaming services (Twitch.Tv, YouTube Gaming, etc.). FIG. 1 is an example network and other approaches and configurations are contemplated. In this example, there is a home with broadband access, such as via fiber-to-the-x (FTTx), x digital subscriber loop (xDSL), hybrid-fiber coax (HFC), and the like. The home can include WiFi for accessing various user devices, set top boxes (STB), etc. Also, there is a wireless subscriber with user equipment (UE) accessing a 4G/Long Term Evolution (LTE) network, e.g., the x radio access network (xRAN).

The main steps of the method for identifying and isolating network performance issues throughout a media content delivery path are the following:

Step 1. Deploy a set of test agents organized into a Directed Acyclic Graph (DAG) where directed edges represent client-servers relations. Leaves of the DAG are client-agents with no other agents considering them as HAS server. Roots of the DAG are test agents which request the OTT media from a streaming service server.

As described herein, the DAG is a term used to define the relationship (connectivity) of the test agents. The test agents can be viewed in such terms—It is a graph because it connects nodes through edges, it is directed because the relations are client/server relations, thus directed, It is acyclic, because otherwise if there is a cycle in the graph it means the download chain is actually a loop and the download time will be infinite.

Step 2. Select all test agents forming an OTT media service delivery path within the DAG. A delivery path traverses the DAG from one leaf to one root.

Step 3. Configure all selected test agents. The configuration describes the selected path so that test agents can request content using the selected path of test agents. In addition, the configuration includes the target URL on the service under test, content delivery quality parameters, buffering target which is the buffer advance the HAS clients will attempt to maintain during the simulated playback, as well as a test duration limit.

Figure 2:
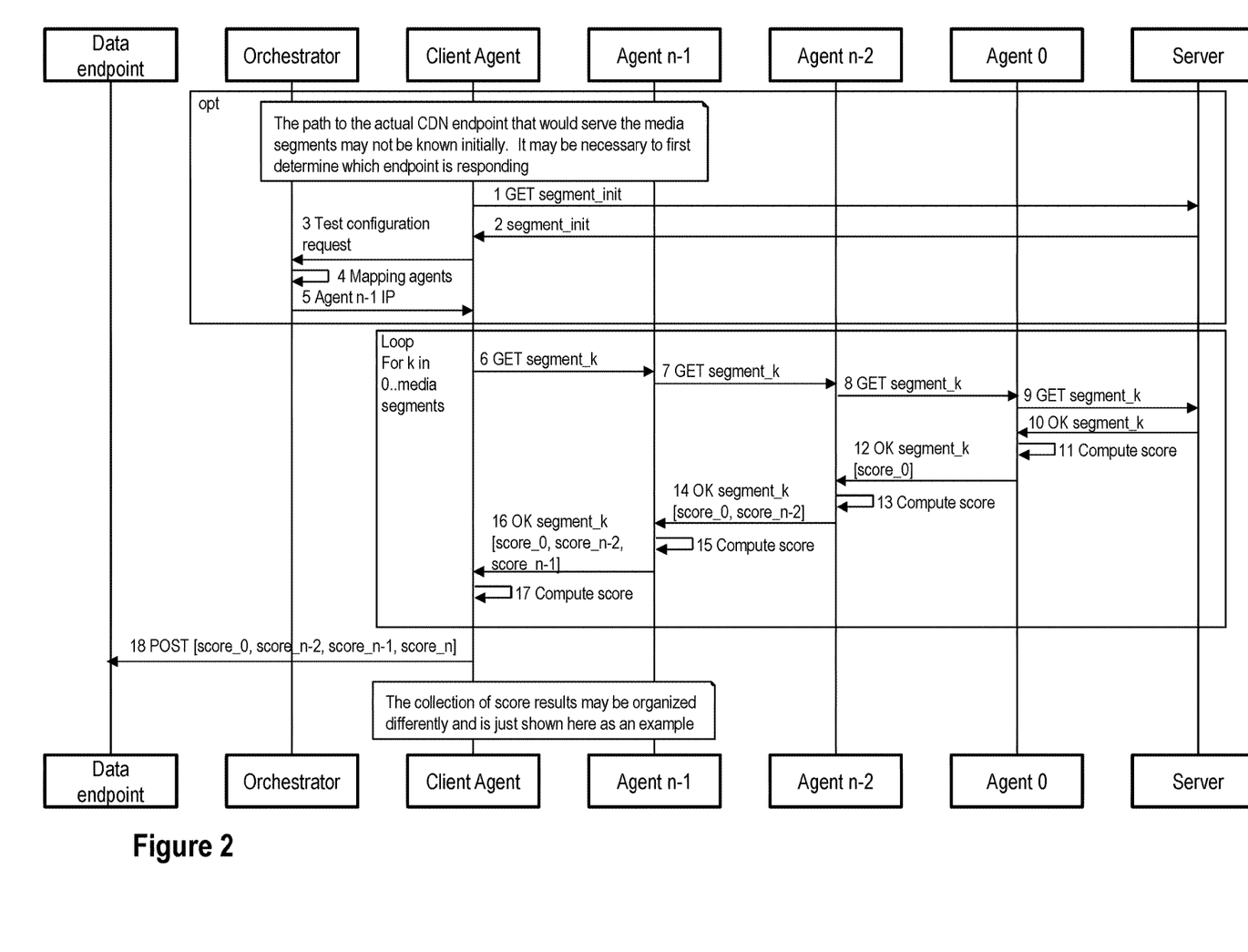
FIG. 2 is a sequence diagram for the details of steps 4, 5, 6, and 7.

FIG. 2 is a sequence diagram for the details of steps 4, 5, 6, and 7 in the method.

Figure 4A:
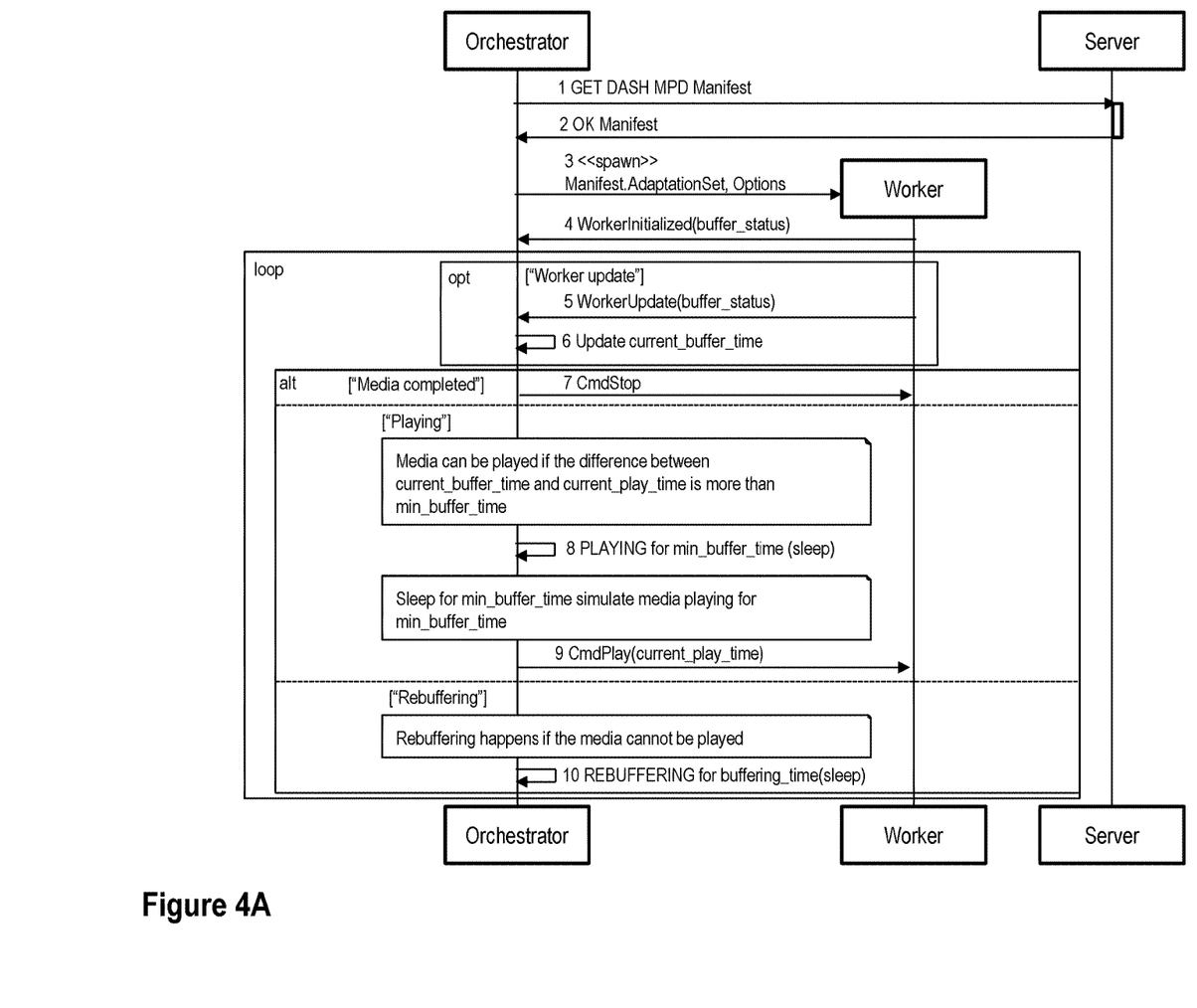
Figure 4B:
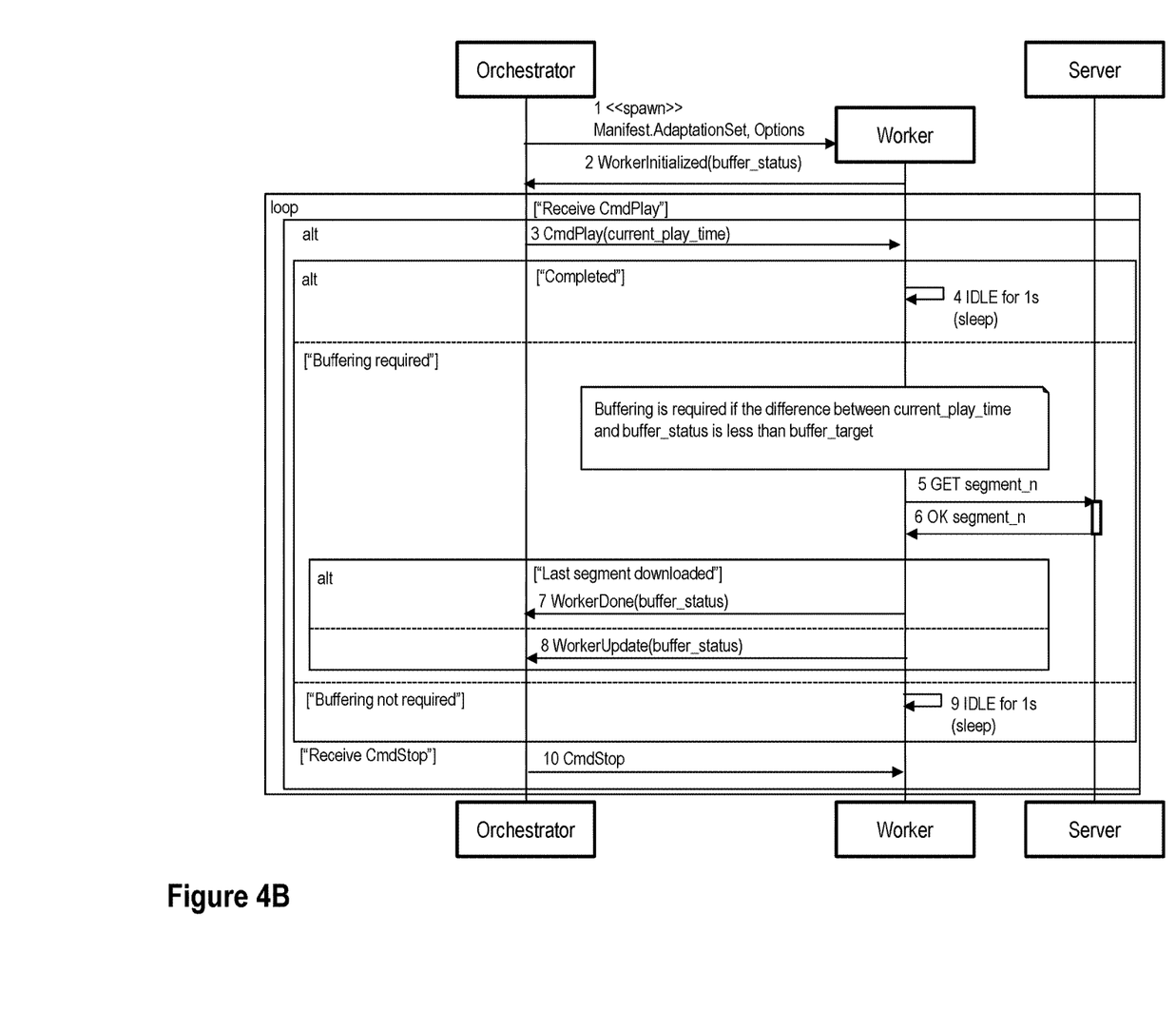

Step 4. For each selected test agent, simulate a HAS media playback using the next test agent as the HAS server, as described in the configuration. The root agent directly request content to the media server providing the HAS service using the configured target URL. Simulating a media playback consists in requesting media segments from the HAS server when the difference between simulated playtime and media buffered duration is lesser than the configured buffering target. The test continue until the simulated playtime is greater than the configured test duration limit. During the simulated playback, each selected test agent responds to content segments request from the previous test agent. FIG. 4 illustrates an example of the communication exchanges between the orchestrator and one worker during a simulated playback and includes FIG. 4A for the orchestrator perspective and FIG. 4B for the worker perspective. Note, the idle times in FIG. 4 are shown as 1 sec for illustration purposes and can be generalized to any timeout parameter.

Step 5. During the simulated playback and at fixed interval, each selected test agent, monitors the main influence factors related to QoE. For example: a) number of stalling events, b) total duration of stalling events, c) average interval between stalling events, d) length of content. Each selected test agent compute a quality estimation score (e.g., MOS), for example using the Yamagashi and Hayashi Parametric Non-intrusive Assessment of TCP-based multimedia Streaming quality (P.NATS) model, the model output O.23 of the ITU P.1203 Standard, or any other relevant QoE model.

Step 6. Report the collected metrics, influence factors and QoE score to either continuously during the test or a single time at the end of the test.

Step 7. Compare the QoE scores from test agents forming a media service delivery path to isolate any performance degradation using the following metrics: total loss from the root to the last test agents ($Perf_{TL}$), the current loss ($Perf_{CL}$) between each pair of consecutive test agents and the initial loss ($Perf_{IL}$) on the root test agent. Then, these performance indicators are compared to isolate any performance degradation. In the following formulas, scores are numbered from 0 to n, where $Score_0$ is the QoE score of the root agent and $Score_r$ is the QoE score of the last test agent.

$$Perf_{IL}=1.0-Score_0$$

$$Perf_{TL}=Score_0-Score_n$$

$$Perf_{CL}=Score_{i-1}-Score_i$$

Figure 3:
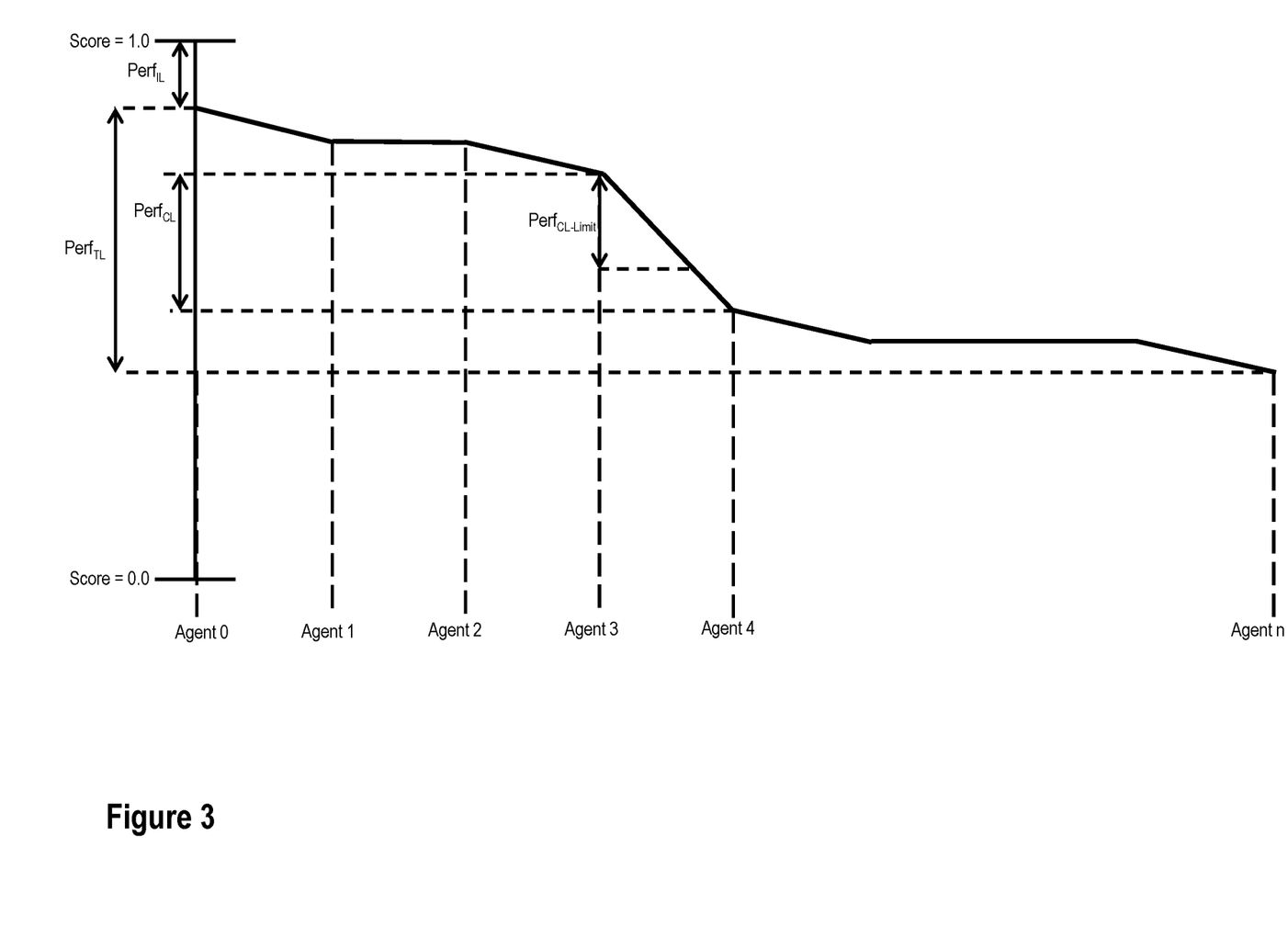
FIG. 3 illustrates an example of performance degradation throughout a chain of test agents.

Considering QoE score range between 0 and 1 (1 being a perfect score), FIG. 3 illustrates an example of performance degradation throughout a chain of test agents. In this example, a significant loss of performance is located between test agents 3 and 4.

The performance limits are defined as follows:

$Perf_{IL-Limit}$: Performance loss threshold to declare that there is an issue due to initial loss (Agent 0)

$Perf_{TL-Limit}$: Performance loss threshold to declare that there is an issue considering the total loss from the first to the last test agents $Perf_{CL-Limit}$: Performance loss threshold to declare that an issue is located between this pair of consecutive test agents The isolation of QoE issues is accomplished by the following rules:

If $Perf_{IL} > Perf_{IL-Limit}$ then there is an issue between the server and the test agent_0

Elsif $Perf_{TL} > Perf_{TL-Limit}$ then, for each pair of consecutive test agents, if $Perf_{CL} > Perf_{CL-Limit}$ then there is an issue between test agents i−1 and i Example 1: Local Arena Network Diagnostic Consider a home network comprising a home router (Box), a WiFi repeater (WiFi), and a Personal Computer (PC) connected to the network through WiFi. An Internet Service Provider (ISP) may want to diagnose whether QoE issues are due to the ISP's network or from the home network.

Steps 1, 2—The ISP deploys test agents on each equipment of the home network. The ISP also deploys a test agent within the access network and labelled agent_0. The test agents form a single chain: agent_PC→agent_WiFi→agent_Box→agent_0. All test agents are selected with agent_PC the leaf and agent_0 the root.

Step 3—The configuration given to all agents provides the description of the chain of test agents and the content URL on a remote server example.com/has/manifest.mpd. The configuration also sets set the selected video quality to 1080p, a buffering target of 30 s, and a test duration limit of 180 s.

Steps 4, 5, 6—To conduct the test, the agent_PC initiates the HAS with agent_WiFi. Test agents along the service delivery path are sequentially triggered to establish HTTP connection and follow the HAS protocol using the next test agent in the chain as their HAS server. The agent_0 directly connects to the HTTP server at example.com. When a server responds, the test agent uses the received data to 1) simulate a HAS media playback and 2) respond to the previous test agent request. While simulating media playback, test agents monitor their QoE during the test and reports results to an online service providing storage and analysis capabilities using an HTTP API. The QoE module implemented by the test agents implements the ITU-T P.1203 O.23 model.

Step 7—The agents report metrics once the test completes as presented in the following table. In this table, N is the number of stalling events, L is the total duration of stalling events in seconds, T is the total length of the media in seconds, and A is the average interval between stalling events in seconds. The SI value is computed according to P.1203 and projected on a 1-5 continuous scale giving the 0.23 QoE score.

|     | agent_0    | agent_Box  | agent_WiFi | agent_PC   |
| --- | ---------- | ---------- | ---------- | ---------- |
| N   | 0          | 0          | 3          | 3          |
| L   | 1          | 1          | 42         | 45         |
| T   | 180        | 180        | 180        | 180        |
| A   | 0          | 0          | 8          | 8          |
| SI  | 0.99391359 | 0.99391359 | 0.55917769 | 0.54902955 |
| QoE | 4.97565437 | 4.97565437 | 3.23671074 | 3.19611821 |

According to the previous description of step 7, performance degradation metrics are computed as follows using SI as the QoE measurement.

$$Perf_{IL}=1-0.99=0.01$$

$$Perf_{TL}=0.99-0.54=0.45$$

$$Perf_{CL01}=0.99-0.99=0$$

$$Perf_{CL12}=0.99-0.55=0.44$$

$$Perf_{CL23}=0.55-0.54=0.01$$

In this scenario, the analysis service would indicate that the network performance degradation si due to $Perf_{CL12}$, meaning that issues are located between the agent_Box and the agent_WiFi as it is between those two agents that the QoE degrades more than the limit.

Example 2: Network Diagnosis

In another example, an ISP wants to measure the capability of multiple paths within its network to deliver a media streaming service provided by a third-party OTT Service Provider (SP).

Step 1—The ISP deploys within its network several test agents. Some test agents are located on the edge of the network, for instance in devices connected to the network over WiFi or LTE. These test agents are considered leaf agents. Some other test agents are located near the SP and are identified as root agents.

Step 2—Using the network's topology known by the ISP, the ISP determines a path from one leaf test agent to the closest root test agent. Test agents along the path are selected and identified as one single test path. The ISP determines a path for each leaf test agent available.

Step 3—Similar to example 1.

Step 4—To conduct the test, all leaf test agents are triggered simultaneously. Similarly to example 1, test agents request media content to their configured test agent.

Step 5—In this example, the graph formed by selected test paths is a DAG. As a result, some test agents may receive multiple requests from multiple test agents. In this case, a test agent stores its received response from its mate test agent and transmits it to any other test agent making a request.

Step 6—Similar to example 1.

Step 7—The analysis step is similar to the one described in example 1. However, as metrics were collected from multiple paths in parallel, the analysis is conducted separately for each individual path. As a result, QoE score collected on some test agents part of multiple paths will contribute to multiple path analysis.

This solution provides the capacity of measuring reliably intermediate points throughout the media service delivery path to identify and isolate QoE issues.

This invention uses a single media stream for all measurement points, limiting the required traffic on the network and ensuring a coherent comparison. The method is applicable to any media service delivery, for example video streaming services based on a HAS protocol.

Figure 5:
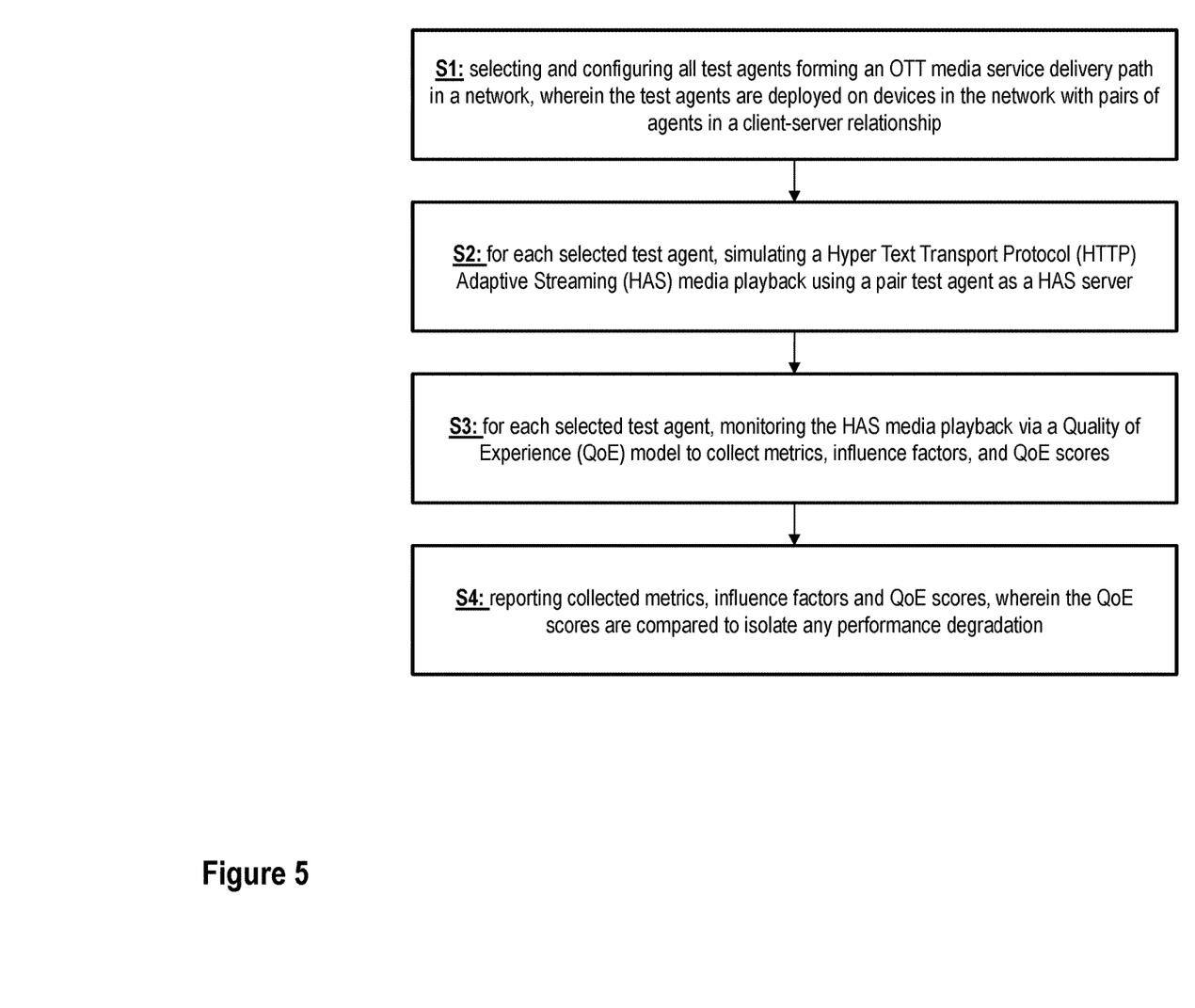
FIG. 5 illustrates a flowchart of a method for identifying and isolating network performance issues throughout an Over-The-Top (OTT) media service delivery path.

In summary, as illustrated in a flowchart in FIG. 5, the main steps of the method for identifying and isolating network performance issues throughout an Over-The-Top (OTT) media service delivery path include: selecting and configuring all test agents forming an OTT media service delivery path in a network, wherein the test agents are deployed on devices in the network with pairs of agents in a client-server relationship (step S1); for each selected test agent, simulating a Hyper Text Transport Protocol (HTTP) Adaptive Streaming (HAS) media playback using a pair test agent as a HAS server (step S2); for each selected test agent, monitoring the HAS media playback via a Quality of Experience (QoE) model to collect metrics, influence factors, and QoE scores (step S3); and reporting collected metrics, influence factors and QoE scores, wherein the QoE scores are compared to isolate any performance degradation (step S4).

The method can be implemented as a computer-implemented method, via a server or other processing device having one or more processors configured to implement instructions, and as instructions embodied in a non-transitory computer-readable medium. The method can also be implemented to run inside one or multiple virtual machine or container instances.

In one embodiment, each selected test agent is implemented as a HAS client.

In one embodiment, the test agents act both as HAS clients and HAS servers.

In one embodiment, the test agents form a Directed Acyclic Graph (DAG) and the OTT media service delivery path traverses the DAG from one leaf to one root.

In one embodiment, the test agents are simulating HAS media client playback by downloading media segments from the HAS server according to a particular HAS protocol.

In one embodiment, the configuration parameters of the selected test agents are at least a) target URL address, b) content delivery quality parameters, c) the buffering target.

In one embodiment, wherein the configuration parameters of the selected test agents are at least a) target Uniform Resource Locator (URL) address, b) content delivery quality parameters, c) buffering target.

In one embodiment, said target address is a parameter which directs to the previous test agent acting as an HAS server in the service delivery path.

In one embodiment, said video delivery quality value represents format, resolution, video encoding, audio encoding and frame rate of the video resource.

In one embodiment, the total loss, said buffering target value represents an amount of video content that each test agent attempts to fetch in advance of the current play time during video streaming. The method as claimed in claim 1, wherein the roots of the DAG are test agents requesting the OTT media from a streaming service server.

In one embodiment, the test agents forming an OTT media service delivery path within the DAG, at the exception of the test agents at the roots, are requesting the OTT media from the mate test agent on each DAG directed edge, from leaf to root.

In one embodiment, the collected metrics are at least one of a) total loss from the root to the client agent ($Perf_{TL}$), b) the current loss ($Perf_{CL}$) between each pair of consecutive test agents, c) the initial loss on the root test agent ($Perf_{IL}$).

In one embodiment, the influence factors are at least one of a) number of stalling events, b) total duration of stalling events, c) average interval between stalling events, d) length of content.

In one embodiment, said QoE score is a quality estimation score.

In one embodiment, said quality estimation score is based on the ITU-T P.1203 Parametric bitstream-based quality assessment of progressive download and adaptive audiovisual streaming services over reliable transport.

In one embodiment, the media service is media streaming service and the media resource is an audio, video, or audio-video resource and the content segments are video segments.

In one embodiment, comparing said quality estimation score of said test agents includes evaluating a total loss from said first to a last agent of said chain ($Perf_{TL}$), a current loss ($Perf_{CL}$) between each pair of consecutive test agents and an initial loss ($Perf_{IL}$) on the first test agent.

In one embodiment, said total loss, said current loss and said initial loss are compared to limits to isolate any performance degradation, wherein said limits are defined as, $Perf_{IL\text{-}Limit}$: Performance loss threshold to declare that there is an issue due to initial loss, $Perf_{TL\text{-}Limit}$: Performance loss threshold to declare that there is an issue considering the total loss from the first to the last test agents, $Perf_{CL\text{-}Limit}$: Performance loss threshold to declare that the issue is located between this pair of consecutive test agents.

In one embodiment, said comparing includes isolation of the QoE issues using the following rules: If $Perf_{IL} > Perf_{IL\text{-}Limit}$ then the issue is between the server hosting the video resource and the first test agent; Elsif $Perf_{TL} > Perf_{TL\text{-}Limit}$ then, for each pair of consecutive test agents, if $Perf_{CL} > Perf_{CL\text{-}Limit}$ then there is an issue between test agents i−1 and i.

The embodiments described above are intended to be exemplary only. The scope of the invention is therefore intended to be limited solely by the appended claims.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Furthermore, some embodiments may include virtual machine or container instances running over a virtualization layer. When distributed over multiple instances, the components are exchanging information between themselves typically via a bridge network. The bridge network can be, for example, but not limited to, a virtual switch. Some of the components are also communicating on a network, such as the Internet. In this case, a virtual NIC is associated to each virtual machine while the containers are connected to the bridge network of the host system providing access to the network.

The invention claimed is:

1. A method for identifying and isolating network performance issues throughout an Over-The-Top (OTT) media service delivery path including:
    selecting and configuring all test agents forming an OTT media service delivery path in a network, wherein the test agents are deployed on devices in the network with pairs of agents in a client-server relationship, and wherein the test agents form a Directed Acyclic Graph (DAG), and the OTT media service delivery path traverses the DAG from one leaf to one root, wherein the tests agents forming an OTT media service delivery path within the DAG, with the exception of the test agents at one or more roots, request OTT media from the pair of test agents on each DAG directed edge, from the leaf to the root;
    for each selected test agent, simulating a Hyper Text Transport Protocol (HTTP) Adaptive Streaming (HAS) media playback using a pair test agent as a HAS server;
    for each selected test agent, monitoring the HAS media playback via a Quality of Experience (QoE) model to collect metrics, influence factors, and QoE scores; and
    reporting collected metrics, influence factors and QoE scores, wherein the QoE scores are compared to isolate any performance degradation.

2. The method as claimed in claim 1, wherein each selected test agent is implemented as a HAS client.

3. The method as claimed in claim 1, wherein the test agents act both as HAS clients and HAS servers.

4. The method as claimed in claim 1, wherein the test agents are simulating HAS media client playback by downloading media segments from the HAS server according to a particular HAS protocol.

5. The method as claimed in claim 1, wherein the configuration parameters of the selected test agents are at least one of a) target Uniform Resource Locator (URL) address, b) content delivery quality parameters, and c) buffering target.

6. The method as claimed in claim 5, wherein said target URL address is a URL parameter which directs to a reference video hosted on a video server.

7. The method as claimed in claim 5, wherein said target URL address is a parameter which directs to a previous test agent acting as the HAS server in the service delivery path.

8. The method as claimed in claim 5, wherein a video delivery quality value represents format, resolution, video encoding, audio encoding and frame rate of the video resource.

9. The method as claimed in claim 5, wherein a buffering target value represents an amount of video content that each test agent attempts to fetch in advance of the current play time during video streaming.

10. The method as claimed in claim 4, wherein roots of the DAG are test agents requesting the OTT media from a streaming service server.

11. The method as claimed in claim 1, wherein the collected metrics are at least one of a) total loss from a root to the client agent ($\text{Perf}_{TL}$), b) the current loss ($\text{Perf}_{CL}$) between each pair of consecutive test agents, and c) the initial loss on a root test agent ($\text{Perf}_{IL}$).

12. The method as claimed in claim 1, wherein the influence factors are at least one of a) number of stalling events, b) total duration of stalling events, c) average interval between stalling events, and d) length of content.

13. The method as claimed in claim 1, wherein said QoE score is a quality estimation score.

14. The method as claimed in claim 13, wherein said quality estimation score is based on the ITU-T P.1203 Parametric bitstream-based quality assessment of progressive download and adaptive audiovisual streaming services over reliable transport.

15. The method as claimed in claim 1, wherein the media service is media streaming service and the media resource is an audio, video, or audio-video resource and the content segments are video segments.

16. The method as claimed in claim 15, wherein said resource includes at least two tracks, where one track is a video track and another track is an audio track.

17. The method as claimed in claim 13, wherein comparing said quality estimation score of said test agents includes evaluating a total loss from a first to a last agent of a chain ($\text{Perf}_{TL}$), a current loss ($\text{Perf}_{CL}$) between each pair of consecutive test agents and an initial loss ($\text{Perf}_{IL}$) on the first test agent.

18. The method as claimed in claim 17, wherein said total loss, said current loss and said initial loss are compared to limits to isolate any performance degradation, wherein said limits are defined as:
    $\text{Perf}_{IL\text{-}Limit}$: Performance loss threshold to declare that there is an issue due to initial loss;
    $\text{Perf}_{TL\text{-}Limit}$: Performance loss threshold to declare that there is an issue considering the total loss from the first to the last test agents;

$Perf_{CL-Limit}$: Performance loss threshold to declare that the issue is located between this pair of consecutive test agents.

19. The method as claimed in claim 17, wherein said comparing includes isolation of the QoE issues using the following rules:
   If $Perf_{IL} > Perf_{IL-Limit}$ then the issue is between the server hosting the video resource and the first test agent;
   Elsif $Perf_{TL} > Perf_{TL-Limit}$ then, for each pair of consecutive test agents, if $Perf_{CL} > Perf_{CL-Limit}$ then there is an issue between test agents i-1 and i.

* * * * *